US009777933B2

(12) United States Patent
Pahwa et al.

(10) Patent No.: US 9,777,933 B2
(45) Date of Patent: Oct. 3, 2017

(54) APPARATUS AND METHOD FOR CONTROL OF SOLID DESICCANT DEHUMIDIFIERS

(75) Inventors: Deepak Pahwa, Delhi (IN); William Charles Griffiths, Palm Beach Gardens, FL (US); Rajan Sachdev, Delhi (IN); Kuldeep Singh Malik, New Delhi (IN)

(73) Assignee: BRY AIR [ASIA] PVT. LTD., Gurgaon (IN)

( * ) Notice: Subject to any disclaimer, the term of this patent is extended or adjusted under 35 U.S.C. 154(b) by 778 days.

(21) Appl. No.: 14/344,353

(22) PCT Filed: Sep. 12, 2012

(86) PCT No.: PCT/IN2012/000609
§ 371 (c)(1),
(2), (4) Date: Jan. 13, 2015

(87) PCT Pub. No.: WO2013/038428
PCT Pub. Date: Mar. 21, 2013

(65) Prior Publication Data
US 2015/0153051 A1    Jun. 4, 2015

(30) Foreign Application Priority Data

Sep. 12, 2011    (IN) .......................... 2629/DEL/2011

(51) Int. Cl.
*B01D 53/02*    (2006.01)
*F24F 3/14*    (2006.01)
(Continued)

(52) U.S. Cl.
CPC .......... *F24F 3/1423* (2013.01); *B01D 53/261* (2013.01); *F24F 3/1429* (2013.01);
(Continued)

(58) Field of Classification Search
CPC ..... B01D 53/261; F24F 11/00; F24F 11/0012; F24F 11/0076; F24F 2003/144;
(Continued)

(56) References Cited

U.S. PATENT DOCUMENTS 4,948,392 A    8/1990    Rush
5,188,645 A    2/1993    Fukuhori et al.
(Continued)

FOREIGN PATENT DOCUMENTS

EP    0462828 A2    12/1991
FR    2950419 A1    3/2011
(Continued)

OTHER PUBLICATIONS

PCT/IN2012/000609, International Search Report, Dec. 17, 2012 (3 pages).
(Continued)

*Primary Examiner* — Christopher P Jones
(74) *Attorney, Agent, or Firm* — Abelman, Frayne & Schwab

(57) ABSTRACT

The present invention generally discloses desiccant dehumidifiers control systems. In particular, the present invention relates to solid desiccant dehumidifiers which use a rotor (commonly called a wheel) to dehumidify a process airstream. The invention provides a novel apparatus for control of desiccant dehumidifiers and to an improved method of control of such dehumidifiers, and also to dehumidifiers provided with such control systems.

27 Claims, 8 Drawing Sheets

(51) Int. Cl.
*F24F 11/00* (2006.01)
*B01D 53/26* (2006.01)

(52) U.S. Cl.
CPC .......... *F24F 11/00* (2013.01); *F24F 11/0012* (2013.01); *F24F 11/0076* (2013.01); *F24F 2003/144* (2013.01); *F24F 2003/1458* (2013.01); *F24F 2203/10* (2013.01)

(58) Field of Classification Search
CPC .......... F24F 2003/1458; F24F 2203/10; F24F 3/1423; F24F 3/1429
See application file for complete search history.

(56) References Cited

U.S. PATENT DOCUMENTS

| | | | | |
|---|---|---|---|---|
| 6,447,583 | B1* | 9/2002 | Thelen | B01D 53/06 95/113 |
| 6,751,964 | B2 | 6/2004 | Fischer | |
| 7,886,986 | B2* | 2/2011 | Fischer, Jr. | F24F 3/1423 236/49.3 |
| 8,790,451 | B1* | 7/2014 | Narayanamurthy | B01D 53/261 62/271 |
| 2004/0000152 | A1 | 1/2004 | Fischer | |
| 2005/0262862 | A1 | 12/2005 | Moffitt | |
| 2006/0260332 | A1 | 11/2006 | Matsui et al. | |
| 2008/0108295 | A1 | 5/2008 | Fischer et al. | |
| 2010/0031528 | A1 | 2/2010 | Akkerman et al. | |
| 2012/0118143 | A1* | 5/2012 | Foreman | B01D 53/261 95/10 |

FOREIGN PATENT DOCUMENTS

| | | |
|---|---|---|
| JP | H08141352 A | 6/1996 |
| JP | 2001099451 A | 4/2001 |
| JP | 2010110736 A | 5/2010 |
| JP | 2010247041 A | 11/2010 |
| WO | 2004055443 A1 | 7/2004 |

OTHER PUBLICATIONS

PCT/IN2012/000609, Written Opinion of the EPO, Dec. 17, 2012 (6 pages).
PCT/IN2012/000609, Response to Written Opinion, Apr. 11, 2013 (19 pages).
PCT/IN2012/000609, International Preliminary Report on Patentability, Sep. 24, 2013 (8 pages).

* cited by examiner

FIG.1 - TYPICAL DRY DESICCANT DEHUMIDIFIER
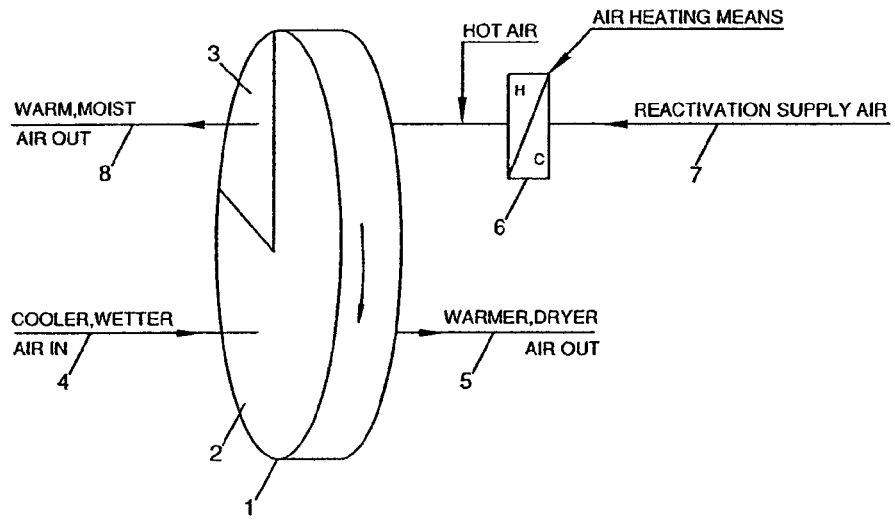
FIG.1A - FLUTE ANGULAR POSITION VS. TIME
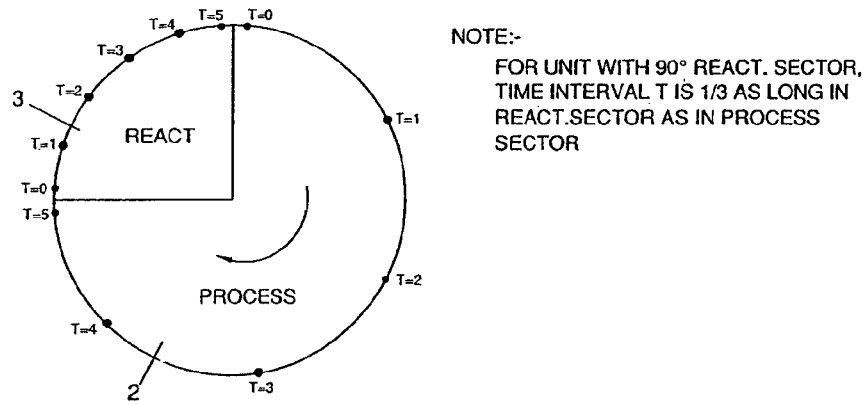
NOTE:-
FOR UNIT WITH 90° REACT. SECTOR, TIME INTERVAL T IS 1/3 AS LONG IN REACT.SECTOR AS IN PROCESS SECTOR
FIG.2 - ADSORPTION WAVE PASSING THROUGH PROCESS SECTOR OF DESICCANT WHEEL
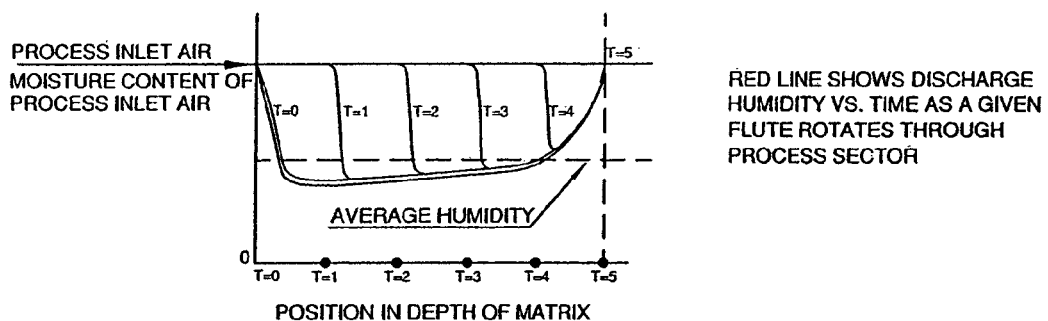
RED LINE SHOWS DISCHARGE HUMIDITY VS. TIME AS A GIVEN FLUTE ROTATES THROUGH PROCESS SECTOR

FIG.3 - TEMPERATURE WAVE PASSING THROUGH PROCESS
SECTOR OF DESICCANT WHEEL

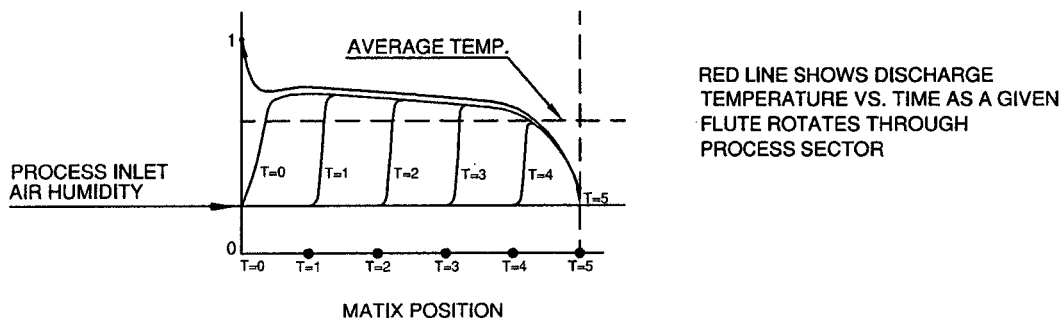

RED LINE SHOWS DISCHARGE
TEMPERATURE VS. TIME AS A GIVEN
FLUTE ROTATES THROUGH
PROCESS SECTOR

FIG.4 - TEMPERATURE WAVE PASSING THROUGH REACTIVATION
SECTOR OF DESICCANT WHEEL
NOTE:- REACT.AIR FLOW DIRECTION OPPOSITE PROCESS AIRFLOW

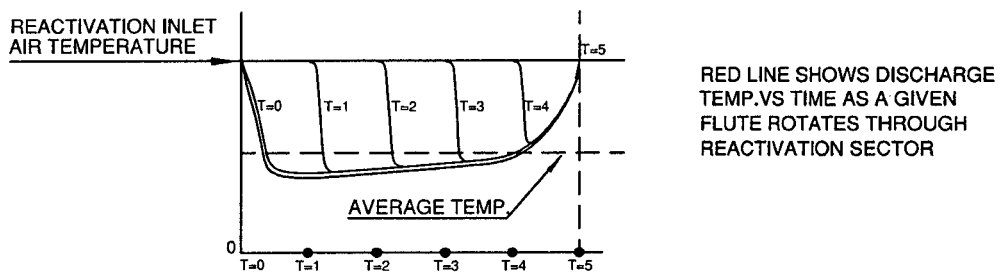

RED LINE SHOWS DISCHARGE
TEMP.VS TIME AS A GIVEN
FLUTE ROTATES THROUGH
REACTIVATION SECTOR

FIG.5 - HUMIDITY WAVE PASSING THROUGH
REACTIVATION SECTOR OF DESICCANT WHEEL

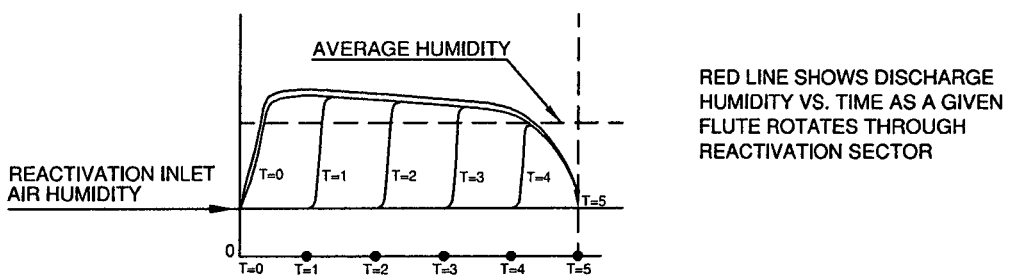

RED LINE SHOWS DISCHARGE
HUMIDITY VS. TIME AS A GIVEN
FLUTE ROTATES THROUGH
REACTIVATION SECTOR

FIG.6 - EFFECTS OF ROTOR SPEED AND AIR MASS FLOW
ON PROCESS-SIDE PERFORMANCE
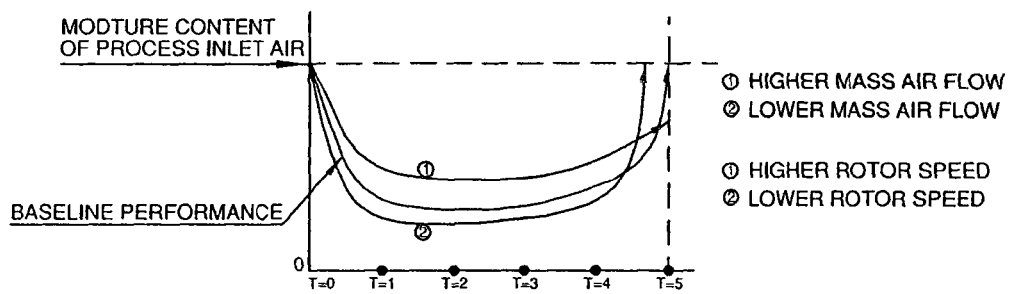
FIG.7 - EFFECTS OF ROTOR SPEED AND AIR MASS FLOW
ON REACTIVATION-SIDE PERFORMANCE
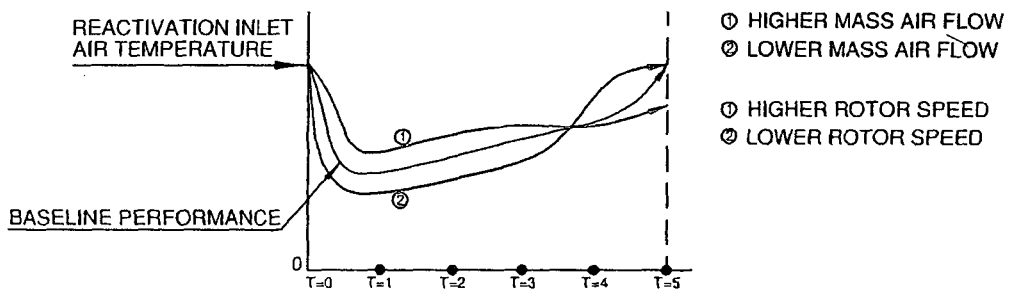
FIG.8 - EFFECT OF PARTIAL PURGE SECTOR ON
PROCESS DEHUMIDIFICATION PERFORMANCE
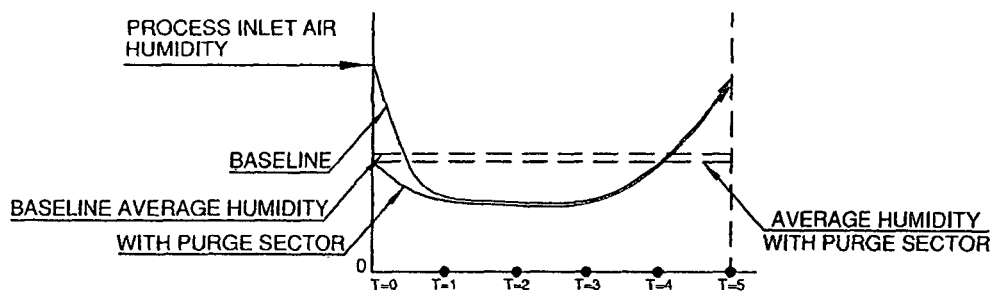

FIG.9 - EFFECT OF PARTIAL PURGE SECTOR
ON PROCESS LEAVING AIR TEMPERATURE
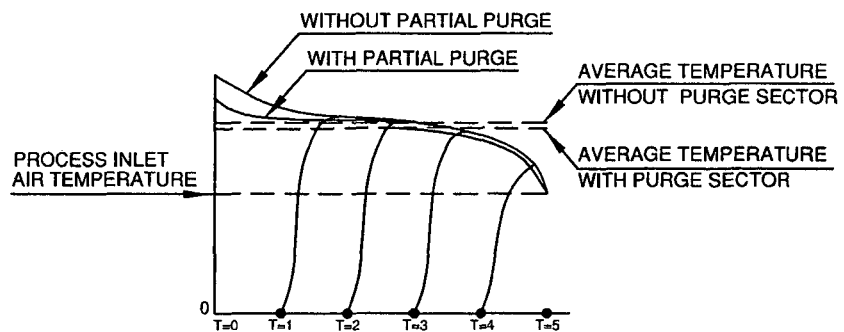
FIG.10 - EFFECT OF PARTIAL PURGE SECTOR ON
REACTIVATION LEAVING AIR TEMPERATURE
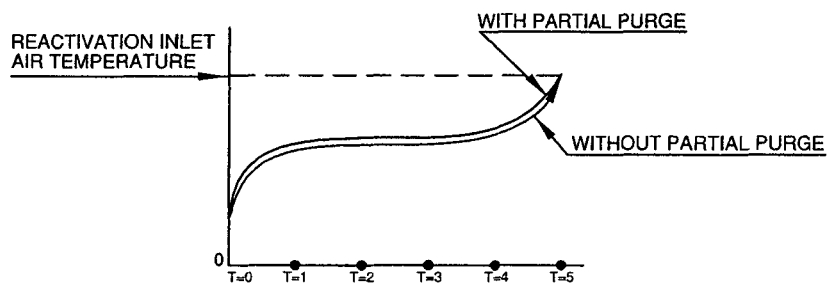
FIG.11 - EFFECT OF CLOSED-LOOP PURGE ON
PROCESS LEAVING AIR TEMPERATURE
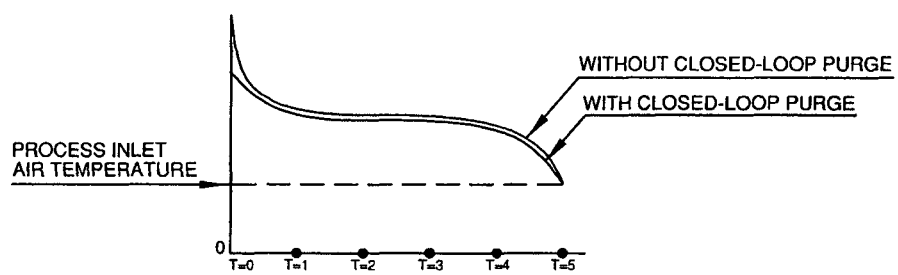

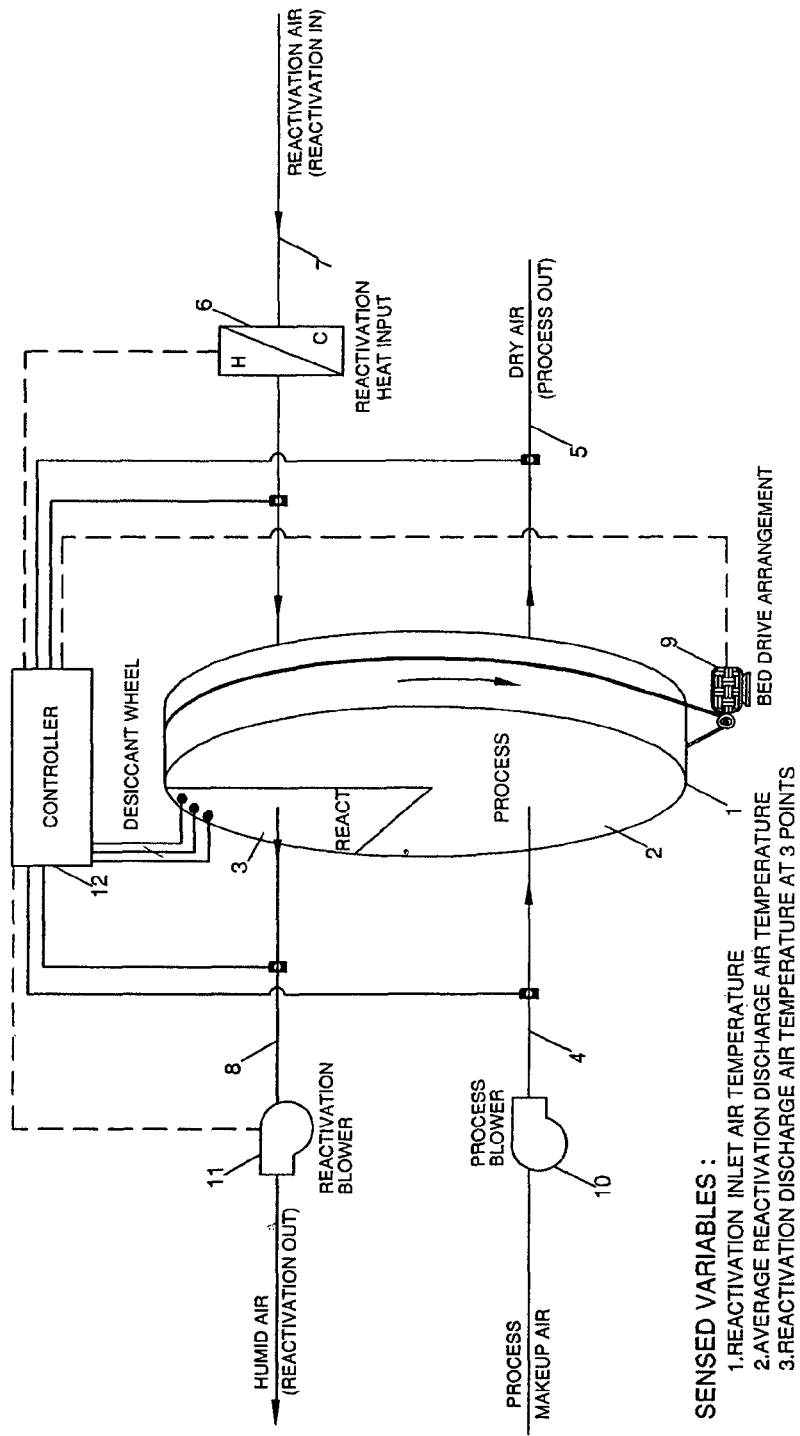

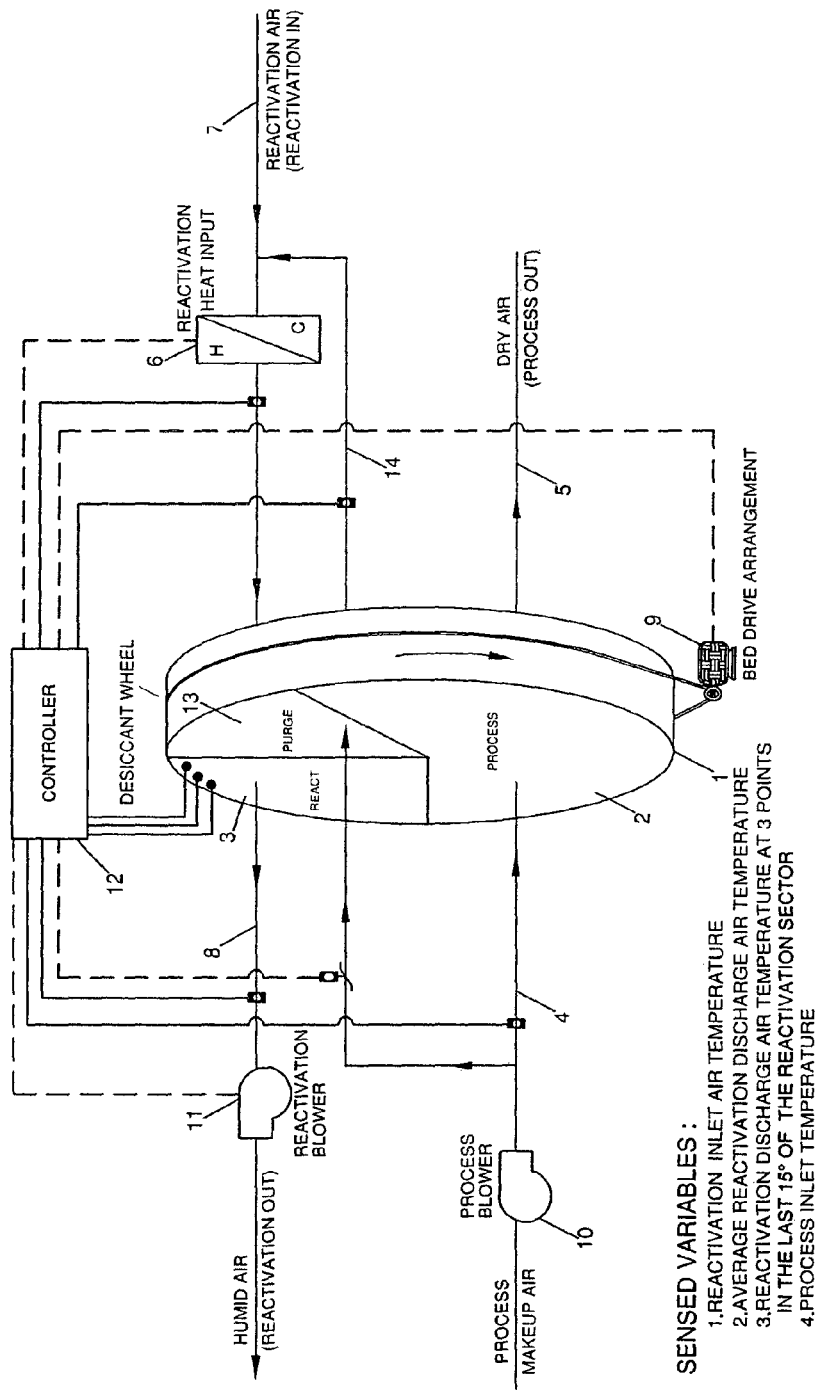

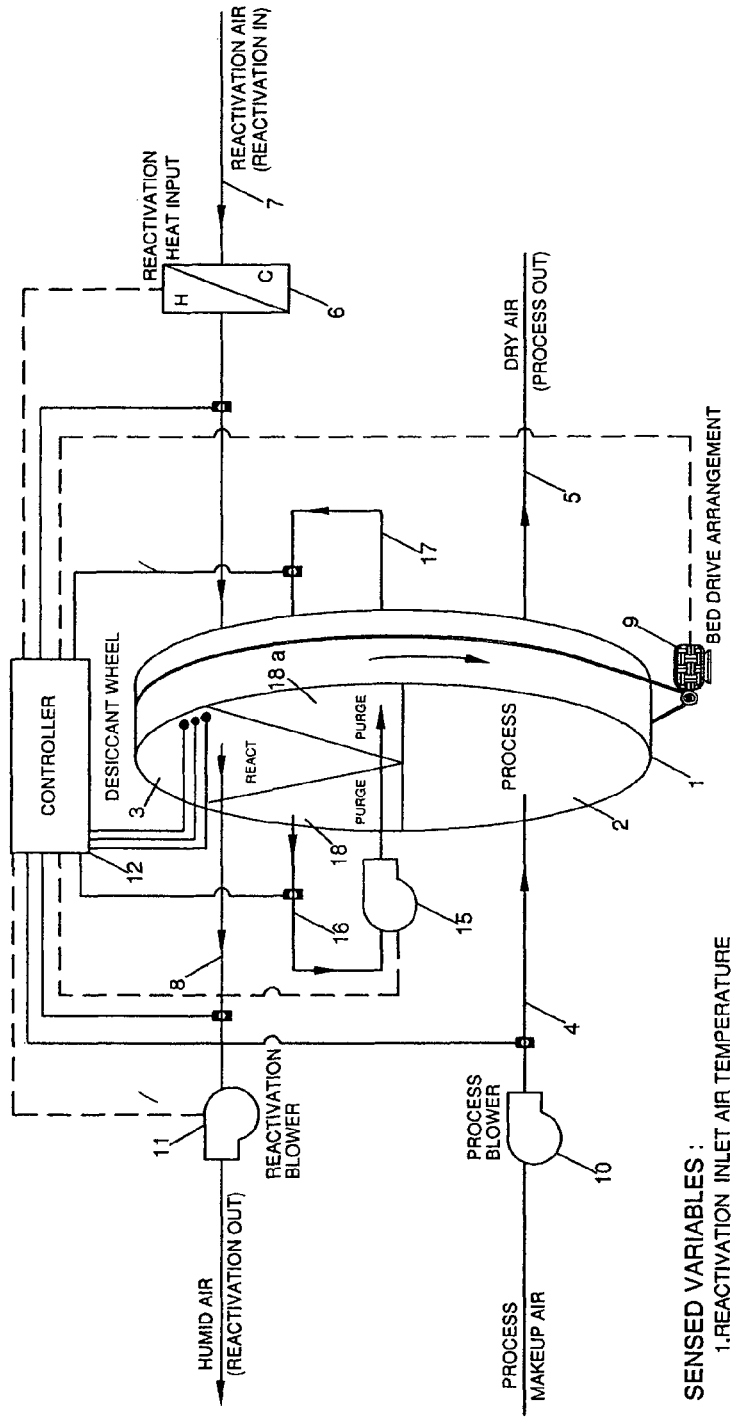

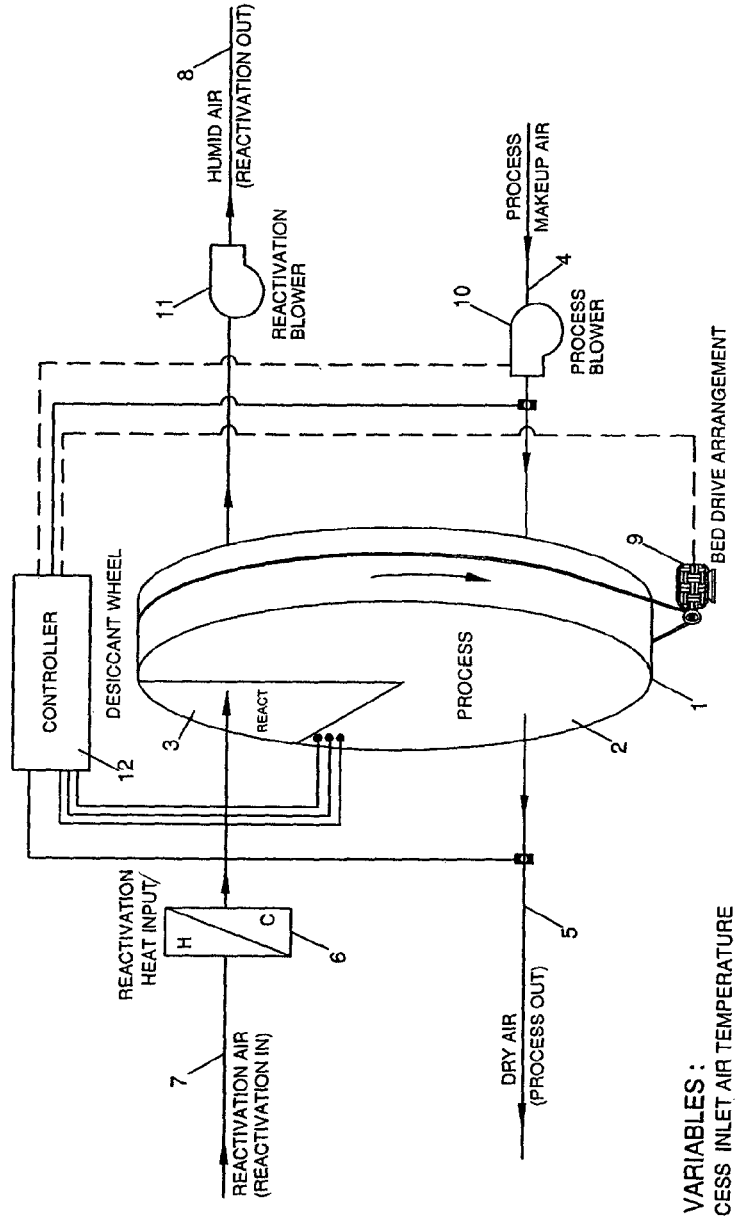

APPARATUS AND METHOD FOR CONTROL OF SOLID DESICCANT DEHUMIDIFIERS

RELATED APPLICATIONS

This application is a U.S. national phase application under 35 USC §371 of PCT/IN2012/000609 filed on Sep. 12, 2012, and claims the benefit under 35 USC §119 of Indian patent application number 2629/DEL/2011 filed September 12, the disclosures of which are incorporated herein by reference in their entireties.

FIELD OF THE INVENTION

The present invention relates generally to desiccant dehumidifiers control systems. In particular, the present invention relates to solid desiccant dehumidifiers which use a rotor (commonly called a wheel) to dehumidify a process airstream. The invention provides a novel apparatus for control of desiccant dehumidifiers and to an improved method of control of such dehumidifiers, and also to dehumidifiers provided with such control systems.

BACKGROUND OF THE INVENTION

Dehumidification is a process of removing moisture from air. There are several known methods of dehumidifying air. However, the two most common methods use refrigeration and desiccants. In the refrigeration based dehumidification method, moisture is made to condense on a cooling coil, thereby removing moisture from an air stream passing over the cooling coil. In the desiccant based dehumidification, the process employed for dehumidification uses absorption or adsorption. An absorption based process uses either liquid or solid desiccants, whereas an adsorption based process uses solid desiccants such as silica gel, activated alumina, molecular sieve, etc.

Desiccant based dehumidifier systems can be either of the twin tower, cyclic type, or of the continuously rotating type. The air to be dried is generally referred to as process air and the air used to regenerate the desiccant is referred as regeneration or reactivation air.

Refrigeration based dehumidification systems are limited in the moisture they can remove. This is because, below a certain dew point humidity, freezing of the coiling coil occurs, thereby requiring a defrost cycle that makes the system more complex. When the air is dried to the required humidity, it is often too cold for the dehumidified space or process. As a result, this air has to be subjected to a reheating process to raise the temperature thereof to the desired level prior to use.

Desiccant dehumidifier systems, on the other hand, dry the air without cooling it and can therefore achieve very low dew points that are necessary for many industrial applications, without the problems of frosting or freezing. Common examples of desiccant dehumidifier use are in the pharmaceutical area for production of drugs, food processing areas, and a wide variety of manufacturing processes which require air at relative humidity or dew points lower than those that can be technically or economically achieved using refrigeration alone.

Most desiccant dehumidifiers are generally composed of a housing that define two or more sets of plenums (commonly called sectors) such that two or more discrete airstreams can be passed through the wheel. The wheel contains a large number of small axially-disposed passages so two or more airstreams can be passed through the wheel without significant cross-mixing. The walls of the passages are impregnated with the desiccant, providing a large contact area between the desiccant and the airstreams passing through it. A first airstream (the process airstream) is passed through the wheel and is dehumidified by the desiccant impregnated in the wheel. A second airstream (the reactivation airstream) is heated and passed through the wheel to drive out the moisture absorbed or adsorbed in the process sector. The wheel is continuously rotated between the process and reactivation sectors so the process air dehumidification is a continuous process. One or more additional airstreams may be passed through the wheel to improve the dehumidification performance and/or reduce the energy requirements of the dehumidifier.

Desiccant dehumidifiers use a considerable amount of heat energy to regenerate or reactivate the desiccant. Accordingly, over the years, significant attention has been given to attempts to minimize the amount of heat energy required. Typically, these efforts have focused on improvements in the configuration of the desiccant bed(s) or wheel, and the control strategies for capacity control of the desiccant dehumidifier system in response to the moisture load in the controlled space, or the process air.

U.S. Patent Publication Number US 2010/0031528 A1 discloses a process for controlling moisture content of a supply gas that is used for drying a product. The process described in this document comprises heating the supply gas if required, determining its temperature and moisture content, and then contacting it with a rotating desiccant wheel, and recovering the dehumidified supply gas. The rotation of the desiccant wheel is controlled using the data relating to the gas temperature and moisture content in combination with the corresponding sorption isotherm of the desiccant. This document stipulates the use of a closed loop of superheated steam as the regenerative medium in order to reduce the high energy consumption of zeolite regeneration. While the document refers to the use of a pressure transmitter to monitor and ensure constant gas flow by the fan and a special transmitter to measure the moisture content of the supply gas, there is no disclosure of the specific means that are used to measure either temperature or moisture content. The method used to determine either temperature or moisture content of the supply gas are therefore, necessarily limited to those that can be used with closed loop steam supply systems.

U.S. Pat. No. 5,188,645 discloses a method and apparatus for dew point adjustment using a dry desiccant dehumidifier. The method disclosed in this document does not use any control mechanism for ensuring determination of moisture or temperature values, and appears to rely instead on providing temperature values that are pre-determined.

U.S. Pat. No. 7,690,582 discloses a humidity control apparatus wherein the amount of heat exchange between the first and second air streams and the amount of moisture exchange between the first and second air streams are varied by changing the rotating speed of the desiccant wheel. Two fixed wheel speeds are used, one for dehumidification of air during summer weather and the other for heating and humidification during winter weather. The humidity control apparatus is switched between two positions—dehumidification operation and humidification/heating operation. The invention of this patent specifically relies on avoiding the use of switching valves. The measurement of temperature of the air that is used appears to be carried out only once, and appears to be a function of pre-determined parameters. This does not provide flexibility in the system operation.

Japanese Patent Publication Number 2010-110736 discloses a method for improving the operating efficiency of a dry desiccant dehumidifier while maintaining a constant dew point humidity of the air at the outlet thereof. The method disclosed in this document involves controlling the reactivation airflow such that the average reactivation outlet temperature is measured and maintained at a fixed value. According to this document, the desiccant is deemed completely reactivated if the average reactivation air outlet temperature is maintained at a fixed value. The document also describes a method and apparatus for controlling the operation of a dry desiccant unit with a purge sector located sequentially between the reactivation and process sectors. The air flow through the purge sector is concurrent with the reactivation airflow and counter current with process airflow. A portion of the process discharge airflow is used for the purge airflow. The airflow through the purge sector is controlled so a constant air temperature is maintained at its discharge. The desiccant rotor speed may be adjusted in proportion with the reactivation airflow. The purge sector uses the residual heat in the wheel for a portion of the reactivation process. Average reactivation and purge discharge temperatures are used. The method and apparatus of this document rely almost exclusively on control of the reactivation air flow to maintain the average reactivation outlet temperature at a predetermined fixed value. The method herein does not provide the necessary flexibility of operation that is desirable and does not enable dynamic control. Japanese Patent Publication Number 2010-247041 describes a method for achieving apparently highly stable variable control operation in controlling a dehumidifier operation. In this method, the average dew point temperature of the supply air may be detected and controlled to satisfy requirements conventionally. The system controls the number of rotations of the rotor or regenerating temperature of a dehumidifier of an adsorbing rotor system according to change of dehumidification load, etc. The method is applicable to a dry desiccant dehumidifier with a purge sector located sequentially between the reactivation and process sectors. This document essentially relates to a method by which the dehumidification load is inferred by measuring the average air temperature rise through the process sector. Controlled variables may include rotor speed, reactivation airflow and temperature, purge sector airflow and process airflow. Purge sector airflow may be in either direction and purge air source may be from process air supply or process air discharge. Again, the method herein does not provide the necessary flexibility of operation that is desirable and does not enable dynamic control due to its almost exclusive reliance on measuring average air temperature rise through the process sector to ensure that this is kept at a predetermined value.

Japanese Patent Publication Number 08-141352 discloses a method to diagnose the degradation of a rotor continuously and forecast time for the replacement of the rotor. The method involves measuring the average outlet temperature of regenerated air in a second stage dehumidifier to diagnose the degradation of the rotor on a first stage dehumidifier. The method and apparatus of this—disclosure is with respect to a dehumidification system having two dehumidifiers in series with the first dehumidifier preconditioning ambient air that is at least a portion of the inlet air for second dehumidifier. The essence of this disclosure consists of inferring the amount of dehumidification occurring in the first dehumidifier by measuring the temperature drop of the reactivation air through the second dehumidifier. The patent is specific to systems with two dehumidifiers in series, and lacks the necessary flexibility that is desirable for solid desiccant based dehumidification systems.

Japanese Patent Publication Number 2001-099451 discloses a method and apparatus wherein the heat amount required for reactivation in a dehumidifier is minimized and wherein a rotor is reactivated with heated air. In this disclosure the rotor is heated with reactivation air, moving in two or more reactivation sectors. The rotor temperature immediately after having moved to the reactivation section is low, but it is heated while moving, and the reactivation air inlet temperature is increased. A temperature distribution is formed in the direction of rotation of a desiccant rotor in a reactivation section. The method and apparatus of this disclosure essentially relates to a dehumidifier having two or more reactivation sectors with progressively higher inlet air temperature in succeeding sectors. Another embodiment shows multiple individual 100% purge sectors paired with corresponding reactivation sectors. Again, the disclosure of this document does not provide any solution to achieving flexibility of operational control in a dynamic manner in solid desiccant based dehumidification systems.

U.S. Pat. No. 6,751,964 discloses an integrated dry desiccant-refrigeration air-conditioning system. The apparatus includes a mechanism for varying the rotational speed of the desiccant rotor to control the amount of moisture removed from the supply airstream or heat transferred to the supply airstream. The scope of the disclosure of this document is apparently to allow the desiccant wheel to be used as a dehumidifier in the summer and an enthalpy recovery wheel in the winter. The objective and purport of this document attempts flexibility but in a different scenario from that required for control operation of a solid desiccant based dehumidifier for minimizing heat energy consumption.

PCT International Publication Number WO 2004/055443 A1 discloses a cooling and dehumidification system including at least one evaporator, at least one variable-speed refrigeration compressor, and at least one condenser and a single desiccant wheel. At least a portion of the air cooled by the evaporator passes through one portion of the desiccant wheel and at least a portion of the condenser air passes through the other portion of the dehumidifier. The speed of the compressors is controlled by at least one condition of the supply airstream, the reactivation airstream and/or the refrigeration system. Variable volume of condenser airflow (hence reactivation airflow) is claimed, for the purpose of maintaining a constant reactivation temperature based on the amount of heat available from the refrigeration system. Variable desiccant rotor speed is not mentioned.

US 2008/0108295 discloses control systems for recovery wheels, ventilation systems with recovery devices, and method of controlling recovery wheels in a ventilation system, methods of controlling a ventilation system to reduce energy consumption, methods of reducing energy consumption of a ventilation system. This document discloses measuring pressure differentials and using the information so obtained to modify the rotor speed. However, the document does not mention modifying the measured parameter itself.

As is evident, while various attempts have been made to provide improvements in heat energy consumption during use, hone of these methods have been successful in providing the desired flexibility of operational control for solid desiccant based dehumidification systems. In fact, it appears that attempts in the art to minimize heat energy consumption during operation of a solid desiccant based dehumidifier have focused on specific situations, rather than attempt an holistic and therefore flexible control system and method.

OBJECTS OF THE INVENTION

It is an important object of the present invention is to provide a method and a system for control of solid desiccant dehumidifiers that ensures maximum flexibility in operation.

It is another object of the invention to provide a method for control of a solid desiccant dehumidifiers that has application irrespective of the number of sectors in the rotor, and in fact is capable of adaptation depending on the number of sectors.

It is a further object of the invention to provide a solid desiccant based dehumidification system that has a significantly high level of flexibility in operational control, wherein the parameters requiring control are capable of being chosen by the user.

It is a further object of the invention to provide a dynamic control method for control of solid desiccant dehumidifiers that continuously sense and monitor temperatures at varying locations in the rotary wheel, and enable inferring of the dehumidification occurring at any given location of the wheel.

It is a further object of the invention to provide an apparatus and method that require minimal expense and are yet flexible in operation thereby providing better data generation for monitoring of reactivation in a desiccant wheel.

SUMMARY OF THE INVENTION

In accordance with the objects of the invention, in one embodiment, the invention provides an apparatus for the control of a rotary solid desiccant dehumidifier that uses a desiccant wheel and is provided with a process and reactivation sector. The apparatus consists essentially of a central control unit; one or more sensors provided operationally associated with the central control unit, and in order to inter alia, measure one or more of the air temperature entering the process sector, the air temperature entering the reactivation sector, the average bulk temperature of the air leaving the process sector, the average bulk temperature of the air leaving the reactivation sector, the temperature of the air leaving the process sector of the wheel just before it rotates into the next sequential sector, the temperature of the air leaving the reactivation sector of the wheel just before it rotates into the next sequential sector. Output signal(s) are generated in the central control unit after the data generated by the sensors is processed using a pre-determined algorithm, and the output signals are directed to one or any combination of apparatus components including the process air moving means, the reactivation air moving means, the reactivation air heating means, the process air pre-cooling means (if used), and the desiccant wheel rotating means.

In another embodiment of the invention, the central control unit is a PLC unit.

In another embodiment of the invention, the apparatus may be provided with a sensor located proximal to the process sector to measure the humidity of the air entering the process sector and provide data generated thereby to the central control unit.

In another embodiment of the invention, the apparatus may include a sensor to provide data to the central control unit by measuring the average bulk humidity of the air leaving the process sector.

In another embodiment of the invention, a bypass duct is included around the process sector, means are provided for controlling the flow of air through the bypass duct, and means are provided for controlling the flow of air through the process sector of the wheel, in both cases as a function of output signals from the central control unit.

In another embodiment of the invention, the apparatus also includes a sensor to provide data to the central control unit by measuring the humidity of the process air after the process air and the bypass air have been mixed.

In another embodiment of the invention, the dehumidifier is provided with a purge sector located sequentially between the reactivation sector and the process sector and means for passing an airstream through the purge sector and directing it to become at least a portion of the air entering the reactivation sector of the wheel.

In a further embodiment of the invention, one or more sensor(s) are provided proximal to the surface of the purge sector to sense the average bulk temperature of the air leaving the purge sector and provide the data generated to the central control unit.

In a further embodiment of the invention, one or -more sensors are provided proximal to the surface of the purge sector to sense the temperature of the air leaving the purge sector just before it rotates into the next sequential sector and provide the data generated to the central control unit.

In another embodiment of the invention, means are provided to control the airflow through the purge sector and are operationally controlled by an output signal from the central control unit.

In another embodiment of the invention, a first sector is disposed sequentially between the process and reactivation sectors, a second sector is disposed sequentially between the reactivation and process sectors and means are provided for re-circulating an airstream through the two sectors.

In a further embodiment of the invention, at least one sensor is provided to sense the temperature of the re-circulating airstream on at least one side of the wheel and provide data generated thereby to the central control unit.

In a further embodiment of the invention, the means for re-circulating an airstream through the two sectors is operationally associated with the central control unit via an output signal generated based on data sensed by the sensor measuring the temperature of the re-circulating airstream.

The present invention also provides an improved method for control of a rotary solid desiccant dehumidifier that uses a desiccant wheel having at least a process and reactivation sector. The method comprises providing a central control unit and one or more sensors located at determined positions proximal to the surface of the rotary wheel of the solid desiccant dehumidifier. The sensors are calibrated to sense and measure one or more of any of the following parameters: the air temperature entering the process sector, the air temperature entering the reactivation sector, the average bulk temperature of the air leaving the process sector, the average bulk temperature of the air leaving the reactivation sector, the temperature of the air leaving the process sector of the wheel just before it rotates into the next sequential sector, and the temperature of the air leaving the reactivation sector of the wheel just before it rotates into the next sequential sector. The data points generated are provided by the sensor(s) to the central control unit, which processes the data based on a pre-determined algorithm. The central control unit then generates individual output signals to control any combination of apparatus components including the process air moving means, the reactivation air moving means, the reactivation air heating means, the process air pre-cooling means (if used), and the desiccant wheel rotating means.

In one embodiment, the method includes providing a sensor to measure the humidity of the air entering the process sector and provide data to the central control unit.

In another embodiment, the method includes providing a sensor that measures the average bulk humidity of the air leaving the process sector and providing the data to the central control unit.

In yet another embodiment, a bypass duct is provided around the process sector, means are provided for controlling the flow of air through the bypass duct, means for controlling the flow of air through the process sector of the wheel. The two respective control means are responsive to respective output signals from the central control unit thereby controlling the airflow through the bypass duct and the process sector.

In another embodiment, a sensor is provided in order to measure the humidity of the process air after the process air and the bypass air have been mixed, and the data generated is then sent to the central control unit for processing and generation of appropriate output signals.

In another embodiment of the method, a purge sector is provided sequentially between the reactivation sector and the process sector and means are provided for passing an airstream through the purge sector and directing it to become at least a portion of the air entering the reactivation sector of the wheel. A sensor is provided to sense the average bulk temperature of the air leaving the purge sector and provide it to the central control unit.

In a further embodiment of the invention, the temperature of the air leaving the purge sector of the wheel is sensed using one or more sensors just prior to the wheel rotating into the next sequential sector, and this data is transmitted to the central control unit.

In a further embodiment of the invention, the airflow through the purge sector is controlled by an output signal generated by the central control unit sent to an airflow controlling means.

In yet another embodiment of the invention, the airflow is re-circulated between a first sector disposed sequentially between the process and the reactivation sectors and a second sector disposed sequentially between the reactivation and process sectors, through means for recirculation provided for re-circulating an airstream through the two sectors.

In a further embodiment of the invention, the temperature of the recirculating airstream on at least one side of the wheel is sensed through at least one sensor and data generated forwarded to the central control unit for processing.

In another embodiment of the invention, the re-circulation of the airstream is controlled by means of an output signal from the central control unit.

The improved method and apparatus of the invention consists of continuously measuring the temperature of the air entering and leaving the process and reactivation sectors. The average or bulk temperature of the process and/or reactivation airstreams leaving the wheel is measured. In addition, the local temperature of the air is measured in the process and/or reactivation discharge plenums just before the wheel rotates into the next sector. This local temperature may be measured at just one point or it may be measured at two or more points a few degrees apart angularly at the leaving air face of the wheel just before it rotates into the next sector.

The temperature of the air leaving the wheel at any angular position is an indirect measure of the amount of moisture adsorption or desorption that is occurring at that point in the rotation of the wheel. This temperature information is used as a portion of the input data to a controller which includes one or more control algorithms to optimize the performance of the dehumidifier. The control algorithm may be designed to optimize the dehumidifier performance in one or more ways, including maximum dehumidification performance, minimum coolant use in the process air system, and/or minimum reactivation heating energy. Additional input data to the controller may include temperature and/or humidity measurements in the dehumidified space or process and outside air temperature and/or humidity.

It is significantly easier, less expensive and more reliable to measure air temperature than air humidity. Simple and inexpensive temperature measuring devices such as thermocouples and thermistors may be used. One of the unique features of the present invention is the measurement of the air temperatures entering and leaving a desiccant wheel to infer the dehumidification or reactivation that is occurring at any given angular position in the wheel during its rotation.

DETAILED DESCRIPTION

The following comprises a non-limiting description of the accompanying drawings that accompany this specification.

FIG. 1 is a schematic of a basic solid desiccant dehumidifier. The arrangement and operational characteristics of this type of dehumidifier are well-known in the art.

FIG. 1A shows the angular position of any given point in the wheel 1 as a function of time, as it passes through the process 2 and reactivation 3 sectors. The time periods shown in the reactivation sector 3 are shorter than those shown in the process sector 2, in direct proportion to the relative sizes of the process 2 and reactivation 3 sectors.

FIG. 2 schematically shows the relationship of process air 5 discharge humidity vs. the time spent in the process sector 2 of any given angular location within the wheel 1 as it rotates through the process sector 2. The effect of the adsorption wave on discharge air 5 humidity can be seen.

FIG. 3 schematically shows the relationship of process air 5 discharge temperature vs. the time spent in the process sector 2 of any given angular location within the wheel 1 as it rotates through the process sector 2. The effect of the adsorption wave on discharge air 5 temperature can be seen.

FIG. 4 schematically shows the relationship of reactivation air 8 discharge temperature vs. the time spent in the reactivation sector 3 of any given angular location within the wheel 1 as it rotates through the reactivation sector 3. The effect of the desorption wave on discharge air 8 temperature can be seen.

FIG. 5 schematically shows the relationship of reactivation air 8 discharge humidity vs. the time spent in the reactivation sector 3 of any given angular location within the wheel 1 as it rotates through the reactivation sector 3. The effect of the desorption wave on discharge air 8 humidity can be seen.

FIG. 6 schematically shows the effect of rotor 1 speed and air mass flow on the process discharge air 5 humidity at various angular positions as the wheel 1 rotates through the process sector 2.

FIG. 7 schematically shows the effect of rotor 1 speed and air mass flow on the reactivation discharge air 8 temperature at various angular positions as the wheel 1 rotates through the reactivation sector 3.

FIG. 8 schematically shows the effect of a partial purge sector 13, disposed sequentially between the process 2 and reactivation sectors 3, on the process discharge air 5 humidity at various angular positions as the wheel 1 rotates through the process sector 2.

FIG. 9 schematically shows the effect of the partial purge 13 sector on the process discharge air 5 temperature at various angular positions as the wheel 1 rotates through the process sector 2.

FIG. 10 schematically shows the effect of the partial purge 13 sector on the reactivation discharge air 8 temperature at various angular positions as the wheel 1 rotates through the reactivation sector 3.

FIG. 11 schematically shows the effect of a closed-loop purge 18, 18a arrangement on the process air 5 leaving humidity at various angular positions as the wheel 1 rotates through the process sector 2.

FIG. 12 schematically shows a reactivation control arrangement in accordance with the present disclosure, with temperature sensing points indicated and controlled components indicated.

FIG. 13 schematically shows a reactivation control arrangement in accordance with the present disclosure for a dehumidifier having a partial purge sector 13, with temperature sensing points indicated and controlled components indicated.

FIG. 14 schematically shows a reactivation control arrangement in accordance with the present disclosure for a dehumidifier having a closed-loop purge 18, 18a arrangement, with temperature sensing points and controlled components indicated.

FIG. 15 schematically shows a process control arrangement in accordance with the present disclosure, with temperature sensing points and controlled components indicated.

The method and system of the present invention will now be explained with reference to a detailed description of the accompanying drawings.

FIG. 1 is a schematic showing the basic elements of a dry (or solid) desiccant dehumidifier. It consists of a rotor 1 (or wheel) containing a media that contains a large number of small passages that are parallel with the axis of rotation of the wheel 1. The media in the wheel 1 consists of a carrier matrix containing a desiccant material such as silica gel or a halide salt that has a strong affinity for water. The desiccant material is impregnated into the media so air passing through the passages is exposed to the desiccant. At the current state of development the media is typically about 80% by weight active desiccant. The wheel 1 is contained in a housing that defines two sets of plenums (or sectors) for two different airflows. The plenums include air seals proximate to the face of the wheel 1 so the two airstreams are isolated from each other, and cross-leakage between the airstreams is minimal. During operation, an airstream to be dehumidified is passed through one sector of the wheel (commonly called the process sector 2). The desiccant adsorbs or absorbs water vapor from the air so the process air 4 leaving the wheel 1 is drier than the air entering it. After a time the desiccant has taken up so much water vapor that its ability to take water from the air is diminished and the water must be driven out of the desiccant to restore its dehumidifying ability. This is accomplished in a reactivation (or regeneration) sector 3. In this sector, a second airstream is passed through the wheel 1. This airstream is heated before it enters the wheel 1 using an external heat source 6 such as electric resistance heating, natural gas and/or a heating coil using steam, hot water or the like. After heating the relative humidity of the air entering the reactivation sector 3 is lower than the relative humidity of the air leaving the process sector 2, so the desiccant releases a portion of its contained water to the reactivation airstream 8 which is typically exhausted to the outside environment. The desiccant wheel 1 is continuously rotated between the process and reactivation sectors so the dehumidification process is continuous and the humidity of the air leaving the process sector 2 is stable.

When a desiccant removes water vapor from the air, the water vapor is essentially condensed into or on the surface of the desiccant. When water vapor condenses it generates heat due to change-of-phase of the water. The heat generated is a function of the temperature at which the condensation occurs, but at typical operating temperatures it is about 1,000 BTU/lb. water condensed. When water vapor condenses into or onto a desiccant, additional heat is generated which is commonly called the heat of sorption. The heat of sorption varies from just a few BTU/lb. water at high relative humidities to over 1,000 BTU/lb. water at extremely low relative humidities. For typical operating conditions the heat of sorption is about 100 BTU/lb., so as a typical value the overall heat of condensation plus heat of sorption is about 1,100 BTU/lb. water. The desiccant media is typically about 80% by weight active desiccant and the desiccant will have a sorptive capacity of about 30% of its weight in water vapor. The heat capacity of the media is typically about 0.5 BTU/lb/degree F., and the total heat of sorption of water vapor into the desiccant is typically 150-300 BTU/Lb media, so it can be seen that the heat capacity of the media is small when compared to the heat of sorption of water vapor from the air. There is nowhere for the heat to go except into the process airstream. The mechanism is: the adsorbed water quickly heats the media to a temperature higher than the air passing through it, and the warmer media in turn heats the air. Because of the geometry of typical media today, the heat transfer rates between the media and the air are high, so the temperature of the media in the wheel 1 at any point is within a few degrees of the air temperature at that point.

It can be readily seen that the inverse of the process described above can be applied to the reactivation sector 3 of the dehumidifier.

Heat and mass transfer typically does not occur throughout the depth of the media in the direction of airflow; it occurs in a "zone" or "wave" that passes though the media (in the direction of airflow) from the time it enters a sector until the time it leaves that sector. The behavior of the adsorption and desorption waves can be graphically represented by identifying specific positions or times in the rotation of the wheel 1 and plotting the instantaneous performance at these positions.

FIG. 1A shows the time/position points that will be used throughout this document to describe the behavior/performance of the wheel 1 as it rotates through the sectors. It should be noted that:

The time intervals shown in the process sector 2 are not the same as the time intervals shown in the reactivation sector 3. For purposes of illustration, five time intervals were selected in both the process 2 and reactivation sectors 3. This means the time increment in each sector is inversely proportional to the size ratio of the sectors—for example, if a configuration is sectored with 90 degrees reactivation 3 and 270 degrees process 2, the reactivation 3 time intervals will be ⅓ as long as the process 2 time intervals.

The adsorption/desorption wave performance is for illustrative purposes.

The actual wave shapes will vary based on the type of desiccant, flute geometry, air mass flow rates, rotor speed, process and reactivation inlet air conditions, and other variables.

FIGS. 2 through 11 schematically show the process 4 and reactivation 7 airstreams passing through the wheel 1 in the same direction, for simplicity. In actual practice the process 4 and reactivation 7 airstreams will usually pass through the wheel 1 in opposite directions.

FIG. 2 illustrates how the adsorption wave passes through the process sector 2 of the wheel 1 as a function of time. It can be seen that as the adsorption wave approaches the process discharge face of the wheel 1 (breakthrough), the discharge humidity vs. angular position of the wheel 1 increases dramatically.

FIG. 3 illustrates how the temperature wave passes through the process sector 2 of the wheel 1 as a function of time. It can be seen that the temperature increase of the process air 5 tracks the moisture depression of the process air 5 at any given angular position of the wheel 1 quite well, once the reactivation heat carryover is removed in the first few degrees of rotation into the process sector 2. This means the process leaving air 5 temperature toward the end of the process sector 2 can be measured and compared to the process air inlet 4 temperature and the average process leaving air temperature to infer the moisture removal performance of the wheel 1 at that location.

FIGS. 4&5 are similar to FIGS. 2&3 but illustrate how the desorption wave and the corresponding temperature wave pass through the reactivation sector 3 of the wheel 1. It can be seen that the temperature decrease of the reactivation air 8 tracks the moisture pickup of the reactivation air 7 at any given position of the wheel 1 quite well, once the initial heating of the wheel 1 media has been achieved in the first few degrees of wheel 1 rotation.

FIG. 6 illustrates the general effects of wheel 1 speed and process-side 2 mass flow on the performance of the process side 2 of a typical dehumidifier. It can be seen that both process airflow 4 and rotor speed have a significant influence on unit performance. As described earlier, the process-side 2 dehumidification performance can be inferred by the average process air 5 discharge temperature and the local process air 5 discharge temperature in the last few degrees of wheel 1 rotation. A number of variables can be adjusted to optimize the performance of the dehumidifier depending on the objectives of the control strategy.

FIG. 7 illustrates the general effects of wheel 1 speed and reactivation-side 3 mass flow on the performance of the reactivation side 3 of a typical dehumidifier. The graph shows the reactivation discharge air 8 temperature vs. rotor 1 position. Due to the difficulty and expense of measuring the humidity of the air leaving the reactivation air 8 sector, the ability to infer reactivation discharge air 8 humidity at any position based on reactivation air 7 entering temperature and discharge air 8 temperature leaving the wheel 1 at any angular position is essential information for any attempt to optimize the performance of a dry desiccant dehumidifier.

FIGS. 8 & 9 illustrate the effect of a partial purge 13 sector on the performance of a dry desiccant dehumidifier. The graphs show that for a given inlet air condition the partial purge 13 generally improves the dehumidification performance but the same general relationship between process air 4 humidity depression and process air 4 temperature rise still exists. The opportunity exists to improve dehumidifier performance and/or reduce energy consumption by monitoring the temperature of the process discharge air 5 toward the end of the process discharge sector 2 and comparing it to the temperature of the process inlet air 4.

FIG. 10 illustrates the effect of partial purge 13 on the reactivation discharge air 8 temperature. The discharge temperature is raised slightly because of the energy savings of the purge sector 13, but the characteristic rise in discharge air 8 temperature as the wheel 1 rotates out of the reactivation sector 3 remains. This points out the possibility of optimizing the dehumidifier performance to achieve one or more of several performance objectives, including improved dehumidification performance, reduced reactivation 6 energy consumption, improved part-load performance, etc.

FIG. 11 illustrates the effect of a closed-loop purge 18,18a on the process leaving air 5 temperature. The average process air 5 temperature is reduced somewhat and the moisture removal capacity of the dehumidifier is increased somewhat, but the characteristic drop in process leaving air 5 temperature toward the end of the dehumidification cycle indicates the dehumidification wave is breaking through the leaving air face of the process sector 2. If the average process air discharge air 5 temperature and the temperature of the process air 4 passing through the wheel just before it rotates in to the next sector is measured and compared, this information can be used to optimize the performance of the dehumidifier to achieve one or more objectives, including improved dehumidification performance, reduced reactivation 6 energy consumption, improved part-load performance, etc.

FIG. 12 illustrates a basic dehumidifier using the control method and apparatus of the present invention. The control method and apparatus includes a central controller 12, typically a Programmable Logic Controller (PLC), a Building Automation System (BAS) or the like. The objective of this particular control arrangement is to optimize the performance of the reactivation process. The reactivation process can be optimized to achieve one or more of several objectives, including minimum reactivation heat 6 use, maximum dehumidification of the process air 4, and minimum heat rejection to the process airstream.

Sensed variables include one or more of the following in any combination:
Reactivation air 7 temperature entering the wheel 1
Average reactivation discharge air 8 temperature.
Reactivation discharge air 8 temperature at one or more angular points before the wheel 1 rotates from the reactivation sector 3 to the process air sector 2.
Process air 4 inlet temperature.
Average process air 5 discharge temperature.
Controlled variables may include one or more of the following in any combination:
Wheel 1 rotational speed
Reactivation fan 11 speed (reactivation airflow 7)
Heat input 6 to the reactivation air 7

FIG. 13 illustrates a dehumidifier similar to the dehumidifier described in FIG. 12, except a purge sector 13 is added to improve the dehumidification performance, reduce the reactivation heat 6 requirement and reduce the reactivation heat carryover from the reactivation sector 3 to the process sector 2. The control method and apparatus 12 are similar to FIG. 12, but the following are added as possible sensed and controlled variables:
Sensed variables:
Purge sector 13 average discharge air 14 temperature
Controlled variables:
Purge sector 13 airflow control, typically a damper.

FIG. 14 illustrates a dehumidifier similar to the dehumidifier described in FIG. 12, except a closed-loop purge 18, 18a system has been added. The closed-loop purge 18, 18a system consists of two purge sectors 18, 18a situated between the process 2 and reactivation 3 sectors with an independent fan 15 to recirculate an airstream through the two purge sectors 18, 18a. The purge 18, 18a loop is added to improve the dehumidification performance, reduce the reactivation heat 6 requirement and/or reduce the reactivation heat carryover from the reactivation sector 3 to the process sector 2. It should be noted that the airflow in the closed loop 18, 18a may be in either direction relative to the process 4 and reactivation 7 airflows, depending on the specific system performance required. The control method and apparatus 12 are similar to FIG. 12, but the following are added as possible sensed and controlled variables:

Sensed variables include one or more of any of the following in any combination:

Purge loop 16 temperature on the process inlet 4 side of the wheel 1

Purge loop 17 temperature on the reactivation inlet 7 side of the wheel 1 Controlled variables include any one or more of the following in any combination:

Purge loop fan 15

FIG. 15 illustrates a dehumidifier and control system and method similar to that shown in FIG. 12 except the same sensing and control principles are applied to the process sector 2 instead of the reactivation sector 3.

Sensed variables include one or more of the following in any combination:

Process inlet air 4 temperature

Average process discharge air 5 temperature

Process discharge air 5 temperature at one or more angular positions just before the wheel 1 rotates into the reactivation sector 3

Controlled variables include one or more of the following:

Wheel 1 rotational speed

Reactivation fan 11 speed

It will be understood by those skilled in the art that the principles described in FIGS. 13&14 for sensing and control of the reactivation portion 3 of the dehumidifier may also be applied to the process portion 2 of the dehumidifier.

The central control unit that is preferred is a programmable logic controller (PLC). This device provides the advantage of being the most cost-effective method by which a unit with multiple sensed variables can be controlled and multiple control output signals generated as are generally required for a dehumidifier. A PLC also enables the use of a single control program that includes all control options for various embodiments of the present invention and the ability to enable or disable the options required for a particular application.

The central control unit may also comprise a building automation system (BAS). In this case, the control functions of the dehumidifier are included in a larger computer control system meant for an entire building or process. In another embodiment, the central control unit comprises of multiple single-loop controllers provided with the capability for multiple inputs for sensed variables and Proportional-Integral-Derivative control output. In another embodiment, the central control unit comprises a dedicated single board computer that is designed specifically to provide the sensed inputs and control outputs required for the present invention.

The temperature sensors used in the present invention comprise thermistors, thermocouples and platinum resistance temperature detectors.

Depending on the variable that is to be measured/sensed, and the level of accuracy that is required in a particular dehumidification application, a combination of any of these sensor types can also be used.

The humidity sensors that are commonly used comprise a chilled mirror type which measures the dew point humidity of air by passing it over a refrigerated mirror and measuring the temperature at which condensation (dew) begins to form on the mirror. While these instruments are highly accurate and have a quick response to change in air humidity, they are also high cost and high-maintenance. In humidity measurement if the variable being measured is the humidity ratio of the air (in 'grams water/Kg dry air, for example), a calculation is performed to convert the dew point humidity to humidity ratio. These calculations can be done within the instrument. This requires the instrument to include a temperature sensor and electronics to perform the calculation. When a PLC is used as the central control unit, the calculations can be done by the PLC.

The humidity sensor can also comprise a thin-film capacitance type, which measures the relative humidity of air. These sensors are substantially less expensive than the chilled-mirror type and require less maintenance, but they do not respond as quickly to changes in air humidity and are not quite as accurate. If the objective is to measure the humidity ratio of the air, a calculation is performed to convert the relative humidity to humidity ratio. These calculations can be done within the instrument which requires a temperature sensor and electronics to perform the calculation. If a PLC is used, the calculations can be done by the PLC.

The hygroscopic fiber type sensor can also be used. These sensors utilize natural fibers such as horsehair or synthetic fibers that change in length as the relative humidity of the air changes and they absorb or desorb moisture. The change in length is measured and used to mechanically change the position of a device such as a pointer on a dial. This type of hygrometer is the least expensive but is also the least accurate and it responds comparatively slowly to changes in air humidity. This type of sensor is seldom used to control desiccant dehumidifiers.

It will also be understood by those skilled in the art that any combination of process 2 and reactivation 3 sensing and control may be used to optimize the performance of a dry desiccant dehumidifier for any specific application.

We claim:

1. An apparatus for the control of a rotary solid desiccant dehumidifier having a desiccant wheel and provided with a process and reactivation sector, the apparatus consisting essentially of a central control unit; one or more sensors located proximal to the process sector and the reactivation sector, and operationally associated with the central control unit, in order to measure one or more of the air temperature entering the process sector, the air temperature entering the reactivation sector, the average bulk temperature of the air leaving the process sector, the average bulk temperature of the air leaving the reactivation sector, the temperature of the air leaving the process sector of the wheel just before it rotates into the next sequential sector, the temperature of the air leaving the reactivation sector of the wheel just before it rotates into the next sequential sector, air temperatures just before the wheel rotates out of the process and/or reactivation sectors, air temperatures on either side of a purge recirculation loop, the central control unit being provided with a processing unit to process received data and generate output signal(s) using a pre-determined algorithm, the central control unit being operationally connected with one or more of the dehumidifier components to transmit output signals thereto and control their functioning including a process air moving means, a reactivation air moving means, a reactivation air heating means, a process air pre-cooling means (if used), and a desiccant wheel rotating means.

2. An apparatus as claimed in claim 1 wherein the central control unit is a PLC unit, a building automation system unit, or a set of multiple single-loop controllers provided with the capability for multiple inputs for sensed variables and Proportional-Integral-Derivative control output, or a dedicated single board computer that is designed specifically to provide the sensed inputs and control outputs.

3. An apparatus as claimed in claim 1 wherein the apparatus is provided with a sensor located proximal to the process sector to measure the humidity of the air entering the process sector and provide data generated thereby to the central control unit.

4. An apparatus as claimed in claim 1 wherein the apparatus includes a sensor to provide data to the central control unit by measuring the average bulk humidity of the air leaving the process sector.

5. An apparatus as claimed in claim 1 wherein a bypass duct is provided around the process sector, means are provided for controlling the flow of air through the bypass duct, and means are provided for controlling the flow of air through the process sector of the wheel, in both cases as a function of output signals from the central control unit.

6. An apparatus as claimed in claim 5 wherein the apparatus is provided with a sensor to provide data to the central control unit by measuring the humidity of the process air after the process air and the bypass air have been mixed.

7. An apparatus as claimed in claim 1 wherein the dehumidifier is provided with a purge sector located sequentially between the reactivation sector and the process sector and means for passing an airstream through the purge sector and directing it to become at least a portion of the air entering the reactivation sector of the wheel.

8. An apparatus as claimed in claim 7 wherein one or more sensor(s) are provided proximal to the surface of the purge sector to sense the average bulk temperature of the air leaving the purge sector and provide the data generated to the central control unit.

9. An apparatus as claimed in claim 7 wherein one or more sensors are provided proximal to the surface of the purge sector to sense the temperature of the air leaving the purge sector just before it rotates into the next sequential sector and provide the data generated to the central control unit.

10. An apparatus as claimed in claim 7 wherein means are provided to control the airflow through the purge sector and are operationally controlled by an output signal from the central control unit.

11. An apparatus as claimed in claim 1 wherein a first sector is disposed sequentially between the process and reactivation sectors, a second sector is disposed sequentially between the reactivation and process sectors and means are provided for re-circulating an airstream through the two sectors.

12. An apparatus as claimed in claim 11 wherein at least one sensor is provided to sense the temperature of the re-circulating airstream on at least one side of the wheel and provide data generated thereby to the central control unit.

13. An apparatus as claimed in claim 11 wherein the means for re-circulating an airstream through the two sectors is operationally associated with the central control unit via an output signal generated based on data sensed by the sensor measuring the temperature of the re-circulating airstream.

14. An apparatus as claimed in claim 1 wherein said one or more sensors are thermistors, thermocouples, platinum resistance temperature detection sensors, or any combination thereof.

15. An apparatus as claimed in claim 3 wherein the humidity sensor is a chilled mirror type, a thin film capacitance type or a hygroscopic filter type humidity sensor.

16. A method for control of a rotary solid desiccant dehumidifier having a desiccant wheel and provided with at least a process and reactivation sector, the method comprising:
  (a) sensing and measuring any one or more of the following parameters: the air temperature entering the process sector, the air temperature entering the reactivation sector, the average bulk temperature of the air leaving the process sector, the average bulk temperature of the air leaving the reactivation sector, the temperature of the air leaving the process sector of the wheel just before it rotates into the next sequential sector, and the temperature of the air leaving the reactivation sector of the wheel just before it rotates into the next sequential sector through one or more sensors provided at determined positions proximal to the surface of the desiccant wheel, air temperatures just before the wheel rotates out of the process and/or reactivation sectors, air temperatures on either side of a purge recirculation loop;
  (b) forwarding the data generated by said one or more sensors to a central control unit;
  (c) processing said data received in said central control unit according to a pre-determined algorithm;
  (d) generating and forwarding output signals to one or more apparatus components including process air moving means, reactivation air moving means, reactivation air heating means, process air pre-cooling means, and desiccant wheel rotating means.

17. A method as claimed in claim 16 wherein, the humidity of the air entering the process sector is measured and forwarded to the central control unit.

18. A method as claimed in claim 16 wherein the average bulk humidity of the air leaving the process sector is sensed and forwarded to the central control unit.

19. A method as claimed in claim 16 wherein a bypass duct is provided around the process sector, and air flow through the bypass duct or the process sector are controlled via respective control means that are responsive to respective output signals from the central control unit.

20. A method as claimed in claim 19 wherein the humidity of the process air is sensed and measured after the process air and the bypass air have been mixed, and data generated then sent to the central control unit for processing and generation of appropriate output signals.

21. A method as claimed in claim 16 further comprising passing an airstream through a purge sector provided sequentially between the reactivation sector and the process sector and directing it to become at least a portion of the air entering the reactivation sector of the wheel and sensing the average bulk temperature of the air leaving the purge sector.

22. A method as claimed in claim 21 wherein the temperature of the air leaving the purge sector of the wheel is sensed using one or more sensors just prior to the wheel rotating into the next sequential sector, and this data is transmitted to the central control unit.

23. A method as claimed in claim 21 wherein the airflow through the purge sector is controlled by an output signal generated by the central control unit sent to an airflow controlling means.

24. A method as claimed in claim 16 wherein an airflow is re-circulated between a first sector disposed sequentially between the process and the reactivation sectors and a second sector disposed sequentially between the reactivation and process sectors, through means for recirculation provided for re-circulating an airstream through the two sectors.

25. A method as claimed in claim 24 wherein the temperature of the recirculating airstream on at least one side of the wheel is sensed through at least one sensor and data generated forwarded to the central control unit for processing.

26. A method as claimed in claim 24 wherein, the recirculation of the airstream is controlled by means of an output signal from the central control unit.

27. An apparatus as claimed in claim 3 wherein the humidity sensor is a chilled mirror type, a thin film capacitance type or a hygroscopic filter type humidity sensor.

* * * * *